Sept. 12, 1939.     C. A. STEVENS     2,172,524

HANDLE FOR COOKING UTENSILS

Filed Feb. 25, 1939

Inventor
Carl A. Stevens
By Pease and Bishop
Attorneys

Patented Sept. 12, 1939

2,172,524

UNITED STATES PATENT OFFICE 2,172,524

HANDLE FOR COOKING UTENSILS

Carl A. Stevens, Carrollton, Ohio, assignor to The Carrollton Metal Products Company, Carrollton, Ohio, a corporation of Ohio Application February 25, 1939, Serial No. 258,398

3 Claims. (Cl. 16—116)

The invention relates to handles for cooking utensils and more particularly to a handle adapted for use upon such utensils as saucepans, frying pans, skillets, griddles, and similar utensils which are ordinarily provided with a single handle connected to one side thereof by means of which the utensil may be lifted or manipulated.

The object of the improvement is to provide a handle of this character which may be rigidly and securely fastened to the utensil.

Another object is to provide a handle attaching bracket which may be spot welded or otherwise connected to the utensil and means for entirely covering said bracket when the handle is attached thereto.

A further object is to provide a simple, inexpensive and durable construction of handle and attaching means which is held against turning with respect to the utensil.

A still further object is to provide a handle of the character referred to which will remain cool when in use and which will not become charred or burned.

Figure 1:
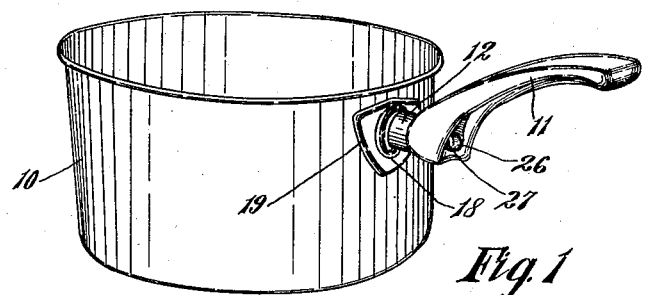
Figure 2:
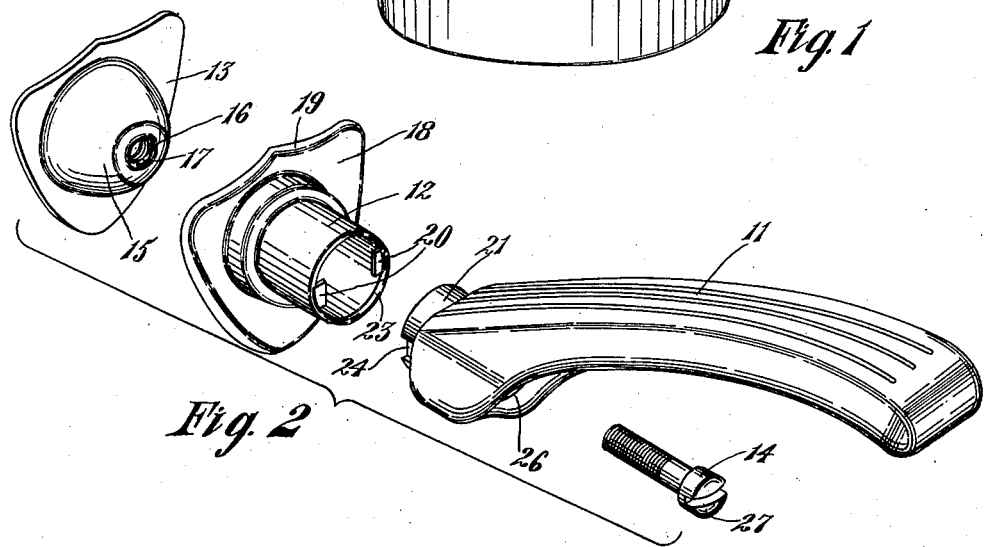
Figure 3:
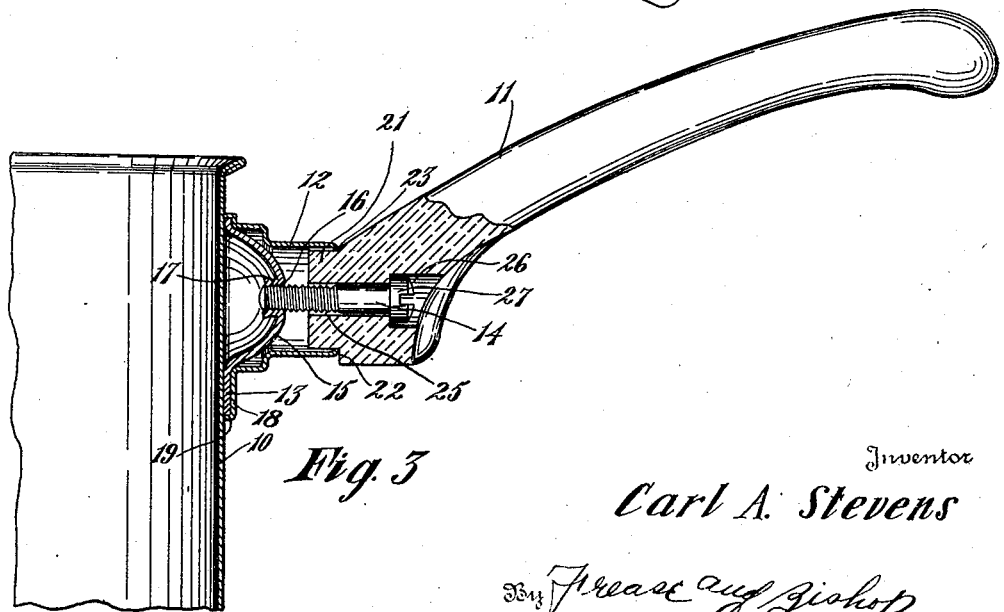

The above objects together with others which will be apparent from the drawing and following description or which may be later referred to may be attained by constructing the improved handle in the manner illustrated in the accompanying drawing in which Figure 1 is a perspective view of a saucepan provided with the improved handle;

Fig. 2, an exploded perspective view of the handle and associated parts for attaching the same to a utensil; and Fig. 3, a sectional view showing a portion of a side of a saucepan with the improved handle attached thereto.

Similar numerals refer to similar parts throughout the several views.

The improved handle is illustrated as applied to a stainless steel saucepan indicated generally at 10, but it should be understood that the invention is applicable to cooking utensils generally.

The handle includes the handle proper indicated at 11 which is preferably formed of a plastic material such as Bakelite, the ferrule 12, the attaching bracket 13, and the screw 14.

The attaching bracket may be formed of sheet iron or the like and is preferably of substantially triangular shape and may be formed to fit tightly the contour of the utensil to which it is to be attached, and has the central substantially semi-spherically portion 15 formed therein and provided with the opening 16 tapped as at 17 to receive the threads of the screw 14.

The ferrule 12 is formed of sheet metal and may be of stainless steel or may be plated so that the exterior may be finished and buffed to have a pleasing appearance which may correspond to the finish upon the utensil.

This ferrule is provided with a flange portion 18 corresponding in form and contour to the flange portion 13 of the attaching bracket and having the angular edge portion 19 adapted to fit around the edge of the attaching bracket and bear against the side of the utensil.

The tubular portion 12 of the ferrule is open at its outer end and provided with the diametrically opposed angular ears 20.

The handle proper or hand grip 11 may be formed of any suitable material having low heat conductivity, and is preferably a molded plastic material such as Bakelite.

This hand grip may be shaped as desired to provide a convenient hand hold and has at its lower or forward end an angular substantially cylindric boss 21 preferably of smaller diameter than the interior of the tubular ferrule 12 and shouldered as at 22 for contact with the inturned annular end 23 of the ferrule.

Diametrically opposed grooves 24 are formed in the boss 21 to receive the inturned ears 20 of the ferrule so as to prevent relative turning movement of the hand grip and ferrule.

A central bore 25, slightly larger in diameter than the screw 14 is located through the boss 21 and outward through the lower portion of the hand grip being counter-sunk as at 26 to receive the head 27 of the screw.

The flanged portion 13 of the attaching bracket is positioned at the desired point upon the exterior of the utensil and spot welded thereto preferably at the three corners of said flange.

The parts are then assembled in the manner shown in Fig. 3, the ferrule entirely covering the attaching bracket and being clamped between the bracket and hand grip by means of the screw 14 whereby the turned over edge 19 of the ferrule engaging the edge of the flange portion 13 of the attaching bracket prevents movement of the ferrule relative to the utensil and the ears 20 engaging in the grooves 24 of the hand grip prevent relative movement of the hand grip and ferrule, whereby the parts are firmly held in assembled position by means of the screw 14.

It will be seen that the semi-spherical portion 15 of the attaching bracket forms an air chamber between the side wall of the utensil and this portion of the bracket, and the ferrule 12 forms an air chamber between the attaching bracket and the hand grip 11.

Only the outer end of the ferrule contacts the hand grip and only the head of the screw contacts the hand grip so that a minimum of heat is conducted from the utensil to the hand grip 11, thus, preventing burning or charring of the hand grip regardless of the material of which it may be formed and causing the hand grip to remain cool at all times.

I claim:

1. In a handle for cooking utensils, a bracket including a flange portion attached to the side wall of the utensil and an outwardly disposed cup portion, a ferrule having a flange portion fitting over and covering the bracket and having an inturned outer end, a hand grip having a boss extending into the ferrule and contacting only the inturned outer end thereof, and a screw located through said boss and engaging the cup portion of said bracket.

2. In a handle for cooking utensils, a bracket attached to the side wall of the utensil, a ferrule having a flange portion fitting over and covering the bracket and having inturned ears at its outer end, a hand grip having a boss extending into said ferrule and provided with longitudinal grooves receiving said inturned ears, and a screw located through the boss and engaging said bracket.

3. In a handle for cooking utensils, a bracket including a flange portion attached to the side wall of the utensil and an outwardly disposed cup portion, a ferrule having a flange portion fitting over and covering the bracket and having an inturned outer end, provided with inturned ears, a hand grip having a boss extending into the ferrule and contacting only the inturned outer end thereof and having longitudinal grooves receiving said inturned ears, and a screw located through said boss and engaging the cup portion of said bracket.

CARL A. STEVENS.